United States Patent
De Boer et al.

(10) Patent No.: US 9,037,619 B2
(45) Date of Patent: May 19, 2015

(54) METHOD FOR ACCESS TO SUBSCRIPTION DATA STORED IN A DATABASE ENTITY IN A MOBILE COMMUNICATION NETWORK

(75) Inventors: Eric De Boer, Perros-Guirec (FR); Alain Bultinck, Longpont sur Orge (FR)

(73) Assignee: Alcatel Lucent, Boulogne-Billancourt (FR)

(*) Notice: Subject to any disclaimer, the term of this patent is extended or adjusted under 35 U.S.C. 154(b) by 1648 days.

(21) Appl. No.: 11/610,998

(22) Filed: Dec. 14, 2006

(65) Prior Publication Data
US 2007/0156704 A1 Jul. 5, 2007

(30) Foreign Application Priority Data
Dec. 15, 2005 (EP) .................................. 05301064

(51) Int. Cl.
| | |
|---|---|
| G06F 12/00 | (2006.01) |
| G06F 17/30 | (2006.01) |
| H04M 11/00 | (2006.01) |
| H04W 4/00 | (2009.01) |
| H04W 8/18 | (2009.01) |
| H04W 24/00 | (2009.01) |
| H04W 8/20 | (2009.01) |

(52) U.S. Cl.
CPC ........... *H04W 8/18* (2013.01); *G06F 17/30864* (2013.01); *H04W 8/20* (2013.01)

(58) Field of Classification Search
None
See application file for complete search history.

(56) References Cited

U.S. PATENT DOCUMENTS

2004/0137918 A1 7/2004 Varonen et al.
2005/0278447 A1* 12/2005 Raether et al. ................ 709/227

OTHER PUBLICATIONS

Nortel Networks: "Access Independence using Two-Tier Mobility", 3GPP TSG SA2 Drafting Meeting on Roo Architecture, May 9, 2000, XP002357885, pp. 1-10.
Nokia: "Sh interface addressing and protocols" 3GPP TSG-CN-WG4 Technical Contribution N4-020677, May 13-17, 2002, XP002371442, pp 1-4.

* cited by examiner

*Primary Examiner* — James Trujillo
*Assistant Examiner* — Cheryl M Shechtman
(74) *Attorney, Agent, or Firm* — Harness, Dickey & Pierce

(57) ABSTRACT

One object of the present invention is a method for access to subscription data stored in a database entity of a mobile communication network referred to as first database entity, storing subscription data referred to as first subscription data for support to network entities of the mobile communication network entities referred to as first network entities, the method comprising a step wherein a database entity of the mobile communication network referred to as second database entity, storing subscription data referred to as second subscription data for support to network entities of the mobile communication network referred to as second network entities, communicates with the first database entity to have access to at least part of the first subscription data, a step wherein an Application Server communicates with the second database entity, to have access to the at least part of first subscription data via the second database entity.

19 Claims, 3 Drawing Sheets

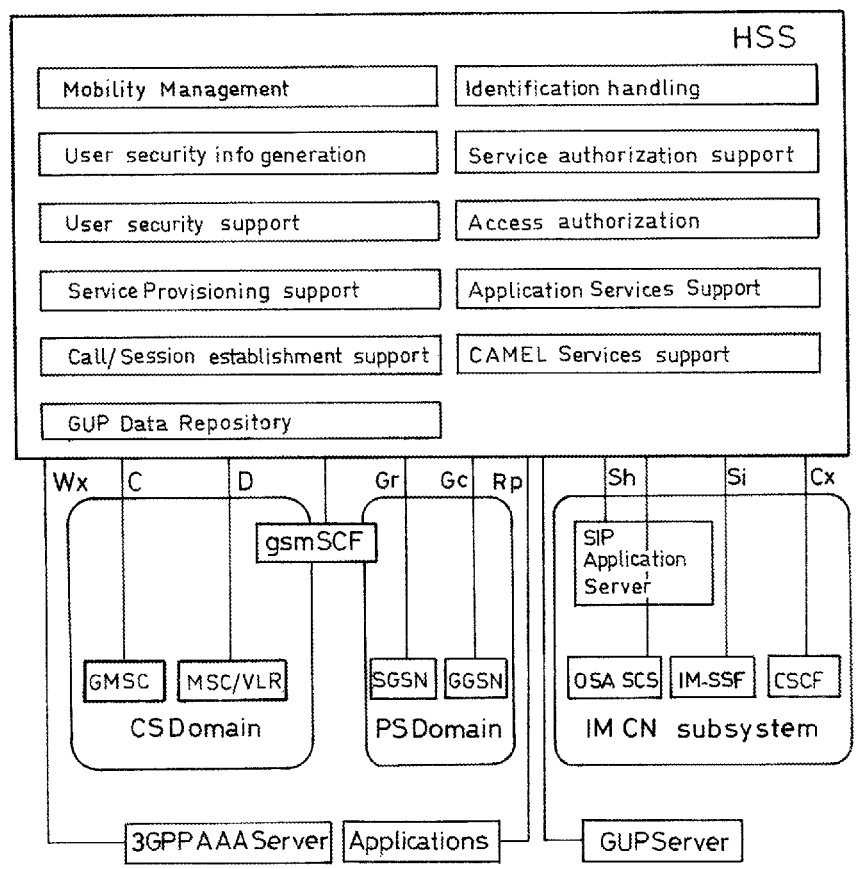
FIG_1

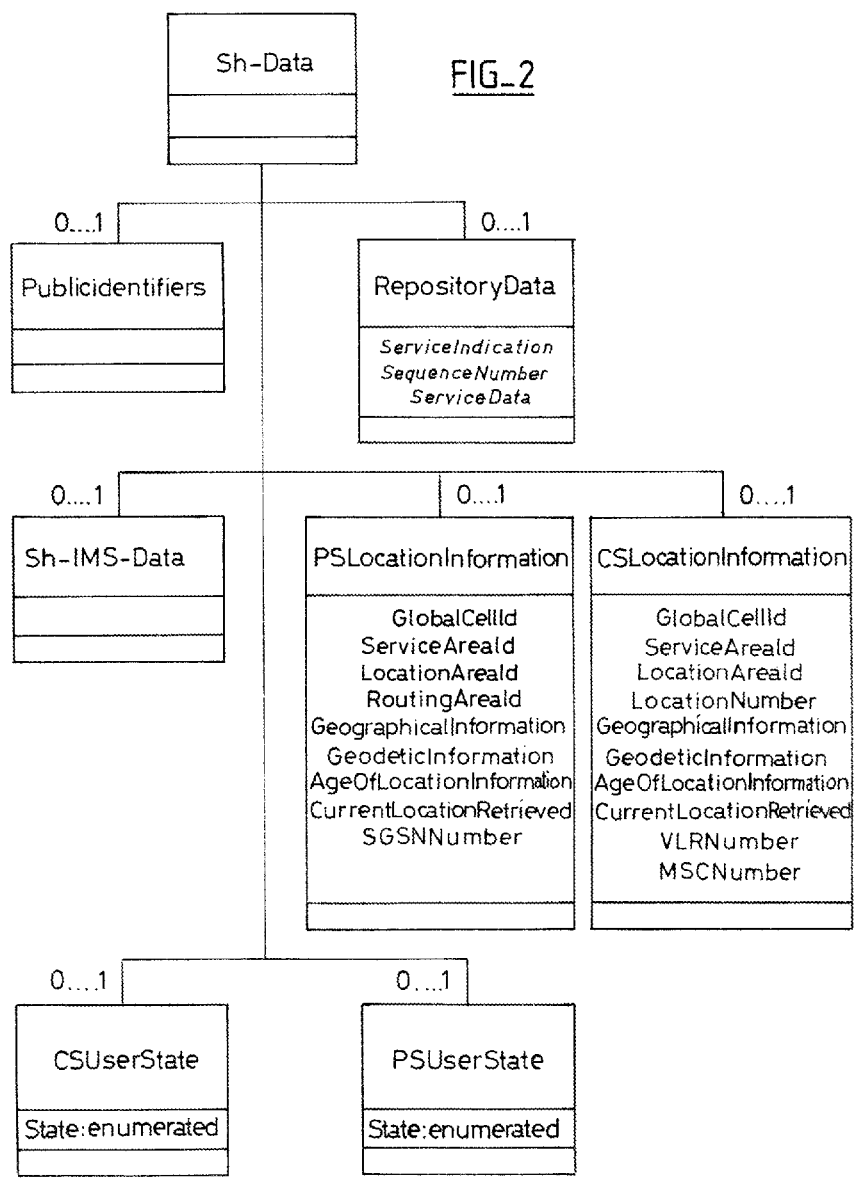
FIG_2

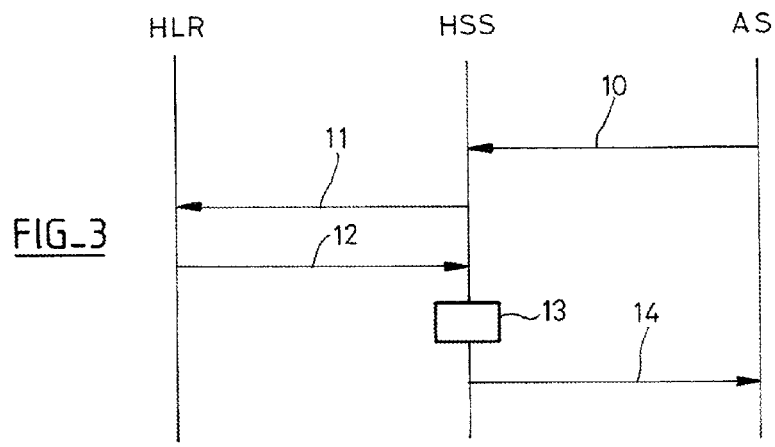
FIG_3
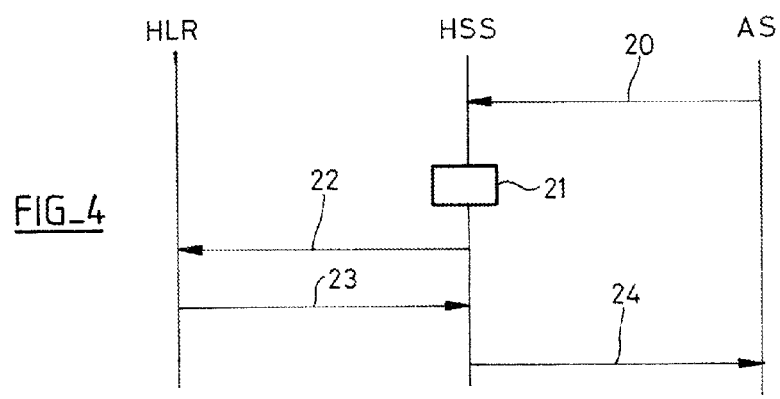
FIG_4
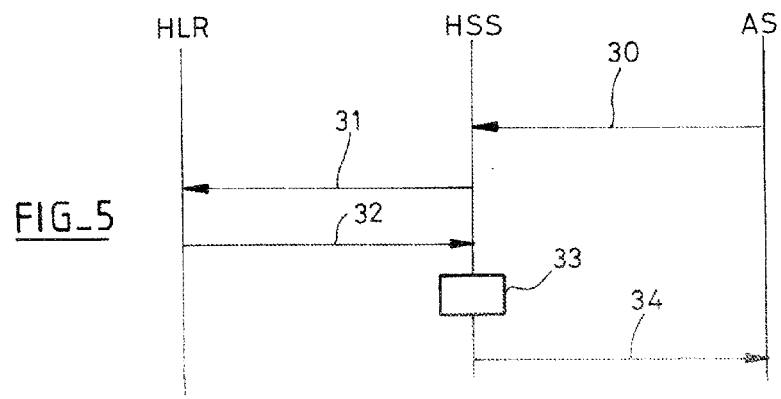
FIG_5

METHOD FOR ACCESS TO SUBSCRIPTION DATA STORED IN A DATABASE ENTITY IN A MOBILE COMMUNICATION NETWORK

CROSS-REFERENCE TO RELATED APPLICATIONS

This application is based on European Patent Application No. 05301064.1 filed Dec. 15, 2005, the disclosure of which is hereby incorporated by reference thereto in its entirety, and the priority of which is hereby claimed under 35 U.S.C. §119.

BACKGROUND OF THE INVENTION

1. Field of the Invention

The present invention generally relates to mobile communication networks.

In a general way, mobile communication networks are subject to standardisation; therefore a more detailed description of such networks can be found in the corresponding standards, published by the corresponding standardisation bodies, such as for example 3GPP ($3^{rd}$ Generation Partnership Project").

2. Description of the Prior Art

It is simply recalled that, as specified in particular in Technical Specification 3GPP TS 23.002, the architecture of such networks is logically divided into an Access Network (AN) and a Core Network (CN), and the architecture of the Core Network is logically divided into different domains and subsystems, including a Circuit Switched (CS) domain, a Packet Switched (PS) domain, and an IP (Internet Protocol) Multimedia Subsystem (IMS).

IMS is defined in particular in Technical Specification 3GPP TS 23.228 published by the 3GPP. As defined in this Technical Specification an architecture for the support of IP multimedia services is divided into an IP-Connectivity Access Network (IP-CAN), and an IP Multimedia CN Subsystem (IMS). An example of access technology for the support of IMS services corresponds to the GPRS CN with a RAN corresponding to GERAN (or more generally a Radio Access Technology of 2.5 Generation or 2.5G) and/or UTRAN (or more generally a Radio Access Technology of $3^{rd}$ Generation or 3G). Other examples of access technologies for the support of IMS services are of course possible, such as for example WLAN (Wireless Local Area Network.

It is also recalled that, as specified in particular in Technical Specification 3GPP TS 23.002, the CN includes a Home Subscriber Server (HSS) which is a database entity containing the subscription-related information to support the call control and session management entities of the different domains and subsystems of the operator. FIG. 1 taken back from 3GPP TS 23.002 recalls the interfaces for communication between the different functionalities of the HSS and the different entities of the different domains and subsystems of the Core Network. The HSS comprises a IMS functionality providing support to IMS subsystem entities and holding subscription data for said support, and a HLR (Home Location Register) functionality providing support to CS domain entities, PS domain entities, and entities called 3GPP AAA Server required for interworking with WLAN, and holding subscription data for said support. The HSS can provide data repository for different IMS Application Servers. As also recalled in FIG. 1, IMS Application Server retrieve subscription data relative to the Application over an interface called "Sh" interface, to support Application Services in the IMS subsystem.

SUMMARY OF THE INVENTION

In such a context, the present invention recognizes that some problems may arise, as will now be explained, to simplify based on examples.

As specified in 3GPP TS 23.228, it is not necessary to deploy a CS domain in order to support an IMS based network. In other words a final objective with the IMS subsystem is to abandon the CS domain, in particular to abandon 2G/3G CS services (such as in particular voice services), and to emulate them via a dedicated IMS application (such as in particular IMS Voice application), with a dedicated Application Server (such as in particular IMS Voice Application Server).

In this context the present invention recognizes that problems may arise, due in particular to the fact that access technologies supporting IMS services are introduced progressively in an already existing infrastructure having access technologies not supporting IMS services; in other words coverage by access technologies supporting IMS services is only partial, and this may still be the case for still a long time.

More particularly, problems may arise when a terminal (or mobile station) passes from a cell supporting IMS Voice services to a cell such as in particular a 2G cell supporting Voice service only in CS domain, or vice-versa. One of the problems recognized by the present invention is that Voice Call service coherence between the legacy CS Call control and the IMS Voice Application is currently not ensured. In other words, one problem recognized by the present invention is that coherence between subscriber data present in the subset of the HLR functionality required by the CS domain and in the IMS Voice application is currently not ensured. Still in other words, the present invention recognizes that there is currently a lack of coherence, due to the fact that different types of services are defined in 2G and IMS environments, for legacy services such as 2G CS services, in particular voice services.

The present invention further recognizes that such problems may arise, due in particular to the fact that CS call control services are supported by CS network entities, namely MSC (Mobile Switching Center), that retrieve service related data from a CS/PS CN database entity: the HLR (Home Location Register), whereas IMS Application Services are supported by IMS entities, namely AS (Application Server), that can retrieve service related data from a IMS specific database entity: the HSS (Home Subscriber Server).

The present invention also recognizes that there may be similar problems of lack of data coherence between session management services in the PS domain, and a dedicated IMS application.

The present invention also recognizes that there may be similar problems of lack of data coherence between WLAN (or more generally wireless access technology) interworking services, and a dedicated IMS application.

Another problem recognized by the present invention is that data used for the support of IMS Application when the user is under coverage supporting IMS currently do not take into account some subscription related data, not specific to IMS, stored in the HLR functionality, while such data could advantageously be used for such a support.

The present invention in particular enables to solve part or all of the above-mentioned problems, or to avoid part or all of the above-mentioned drawbacks. More generally, the present invention enables to improve the quality of service in such networks.

These and other objects are achieved, in one aspect of the present invention, by a method for access to subscription data stored in a database entity of a mobile communication network referred to as first database entity, storing subscription data referred to as first subscription data for support to network entities of said mobile communication network entities referred to as first network entities, said method comprising:
a step wherein a database entity of said mobile communication network referred to as second database entity, storing subscription data referred to as second subscription data for support to network entities of said mobile communication network referred to as second network entities, communicates with said first database entity to have access to at least part of said first subscription data,
a step wherein an Application Server communicates with said second database entity, to have access to said at least part of first subscription data via said second database entity.

These and other objects are achieved, in another aspect of the present invention, by an Application Server for a mobile communication network, said Application Server comprising:
means for communicating with a database entity referred to as a second database entity storing subscription data referred to as second subscription data for support to entities of said mobile communication network referred to as second entities, to have access, via said second database entity, to at least part of subscription data referred to as first subscription data stored in a database entity referred to as first database entity storing subscription data referred to as first subscription data for support to entities referred to as first entities of said mobile communication network.

These and other objects are achieved, in another aspect of the present invention, by a database entity referred to as a second database entity, storing subscription data referred to as second subscription data for support to network entities referred to as second network entities of a mobile communication network, said second database entity comprising:
means for communicating with a database entity referred to as a first database entity, storing subscription data referred to as first subscription data for support to network entities of said mobile communication network referred to as first network entities, to have access to at least part of said first subscription data,
means for communicating with an Application Server, to have access to said at least part of first subscription data via said second database entity.

These and other objects are achieved, in another aspect of the present invention, by a database entity, referred to as a first database entity, storing subscription data referred to as first subscription data for support to network entities of a mobile communication network referred to as first network entities, said first database entity comprising:
means for communicating with a database entity referred to as a second database entity, storing subscription data referred to as second subscription data for support to network entities of said mobile communication network referred to as second network entities, to have access to at least part of said first subscription data.

BRIEF DESCRIPTION OF THE DRAWINGS

These and other objects of the present invention will become more apparent from the following description taken in conjunction with the accompanying drawings:

FIG. 1 is intended to recall the interfaces for communication between the different functionalities of the HSS and the different entities of the different domains and subsystems of the Core Network, FIG. 2 is intended to recall the information model of the data downloaded over the "Sh" interface beteween HSS and AS, FIGS. 3 to 5 are intended to illustrate different examples of a method according to the present invention.

MORE DETAILED DESCRIPTION OF THE INVENTION

The present invention may also be explained as follows, for purposes of illustration considering the example of application of the present invention to ensure coherence between legacy CS call control and IMS Voice Application, it being understood that the present invention is not limited to such an example of application.

Before describing the present invention in a more detailed way in this example of application, some features of the data exchanges over the "Sh" interface (i.e. interface between AS and HSS) will be recalled. More details can be found in particular in 3GPP TS 23.002 and 3GPP TS 29.328.

It is recalled that data held by the HSS include:
Transparent data: these are data that are understood syntactically but not semantically by the HSS. It is data that an AS may store in the HSS to support its service logic. One example is data that an AS stores in the HSS, using it as a repository.
Non-transparent data: these are data that are understood both syntactically and semantically by the HSS.

It is recalled that operations on the "Sh" interface between HSS and AS include:
Data handling procedures,
Subscription/notification procedures.

It is recalled that data handling procedures include:
Data Read procedure (or procedure enabling download of data from the HSS to an AS): This procedure is invoked by the AS and is used to read transparent and/or non-transparent data for a specified user from the HSS. This procedure is mapped to the commands User-Data-Request/Answer of the Diameter protocol specified in 3GPP TS 29.329.
Data Update procedure (or procedure enabling update of data by the AS in the HSS, updating of data covering adding data, modifying data, removing data): This procedure is invoked by the AS and is used to allow the AS to update the transparent (repository) data stored at the HSS for a specified each IMS Public User Identity or Public Service Identity. This procedure is mapped to the commands Profile-Update-Request/Answer of the Diameter protocol specified in 3GPP TS 29.329.

It is recalled that subscription/notification procedures include:
Procedures enabling an AS to subscribe to receive notifications from the HSS of changes in data.
Procedures enabling the HSS to notify an AS of changes in data for which the AS has previously subscribed.

Although the 3GPP specifications do not explicitly split HSS data into data pertaining to the HLR functionality of the HSS and data pertaining to the IMS functionality of the HSS, in order to simplify the description the term HLR data will be used hereinafter to identify subscription data pertaining to the HLR functionality of the HSS, and the term IMS data will be used hereinafter to identify subscription data pertaining to the IMS functionality of the HSS.

In one of its different aspects, the present invention proposes to define the same type of CS call control services in 2G and IMS environments, for legacy 2G/3G CS services such as in particular voice services. This enables in particular to solve the above mentioned problem, i.e. to ensure the above-mentioned Voice Call service coherence.

However, a further problem for such a definition of a same type of CS call control services in 2G/3G and IMS environments is that currently, the operations defined on the "Sh" interface do not allow an Application Server (AS) to access HLR data specific to CS call control.

Indeed, as recalled in FIG. 2 (taken back from 3GPP TS 29.328), illustrating the information model of the data downloaded over the "Sh" interface, only location related data (e.g. the fields defined in "PSLocationInformation, CSLocationInformation") can be accessed over the "Sh" interface. In other words, currently the "Sh" interface does not allow an AS to access HLR CS call control related data. Currently, the only service related data that the "Sh" interface allows an AS to access are IMS service related data.

In another of its different aspects, the present invention proposes that the Application Server uses the HSS as a repository for HLR data. This enables in particular to solve the above-mentioned further problem.

In other words, the present invention takes advantage of the fact that repository data may contain any data that is only interpreted by an AS and stored as transparent data in the HSS (the repository data contains specific data for each dedicated IMS Application). The present invention proposes that HLR data be accessed (read and/or updated) as transparent repository data via the "Sh" interface.

In yet another of its different aspects, the present invention proposes to map the HLR data on the transparent repository IMS data that pertain to the IMS voice Application.

Such a mapping can for example include translating HLR data syntax rules into IMS Voice Call Application data syntax rules. A description of IMS data syntax rules can be found in 3GPP TS 29.328 Annex D, describing the XML ("extensible Markup Language") schema for the "Sh" interface user profile. A description of an example of HLR data syntax rules can be found in 3GPP TS 29.002 specifying the Mobile Application Part (MAP) protocol, in particular in the description of the mechanisms used for enabling a MSC/VLR to receive some supplementary services parameters from the HLR. For HLR data whose syntax rules would not be specified by 3GPP Technical Specifications, such syntax rules could be defined depending on the implementation.

In another of its different aspects, the present invention recognizes that if the same type of CS call control services is provided in both CS and IMS environments, it is important, for this type of services, to "synchronise" the two database entities, i.e. the HLR or database entity in charge of holding legacy services subscription related data, and the HSS or database entity in charge of holding the IMS services subscription related data, the term "synchronise" being understood in the sense that the considered data stored in both entities should be coherent, in particular changes in said data should be taken into account in both entities.

This leads in particular to the following consequences:
HLR CS call control data can be read and/or updated via the "Sh" interface in a complete standardized way by an IMS Voice Application server.
The IMS Voice application server can be notified by a change in HLR subscriber CS call control data.
Some examples of application of the present invention are:
Managing Call forwarding data in a coherent way
Managing CAMEL IN service data and IMS service data in a coherent way.

In one of its different aspects, the present invention proposes a method for access to subscription data stored in a database entity of a mobile communication network referred to as first database entity, storing subscription data referred to as first subscription data for support to network entities of said mobile communication network entities referred to as first network entities, said method comprising:
a step wherein a database entity of said mobile communication network referred to as second database entity, storing subscription data referred to as second subscription data for support to network entities of said mobile communication network referred to as second network entities, communicates with said first database entity to have access to at least part of said first subscription data,
a step wherein an Application Server communicates with said second database entity, to have access to said at least part of first subscription data via said second database entity.

In an example:
said first network entities correspond to CS domain entities,
said second network entities correspond to IMS subsystem entities,
said first database entity corresponds to a subset of a HLR functionality of a HSS, required by a CS domain,
said second database entity corresponds to a IMS Voice Application data set repository of a Home Subscriber Server,
said Application Server corresponds to an IMS Voice Application Server.

Advantageously, in this example, said at least part of first subscription data comprises Call Control services subscription data, and said Application Server communicates with said second database entity to support equivalent CS services in said IMS subsystem based on said Call Control services subscription data.

In another example:
said first network entities correspond to PS domain entities,
said second network entities correspond to IMS subsystem entities,
said first database entity corresponds to a subset of a HLR functionality of a HSS, required by a PS domain,
said second database entity corresponds to a IMS dedicated Application data set repository of a HSS,
said dedicated IMS Application Server needs to use the subser of HLR functionality mentioned above.

Advantageously, in this example, said at least part of first subscription data comprise at least a part of Session Management services subscription data, and said Application Server communicates with said second database entity to support a dedicated IMS Application in the IMS subsystem that needs to used Session Management services subscription data.

In another example:
said first network entities correspond to network entities required for interworking with wireless access technology (such as for example WLAN),
said second network entities correspond to IMS subsystem entities,
said first database entity corresponds to a subset of a HLR functionality of a HSS, required for interworking with wireless access technology,
said second database entity corresponds to a IMS dedicated Application data set repository of a HSS,
said dedicated Application Server corresponds to an IMS Application Server.

In this example, in another example of application of the present invention, said at least part of first subscription data comprise at least a part of interworking services subscription data, and said dedicated Application Server communicates with said second database entity to re use advantageously said interworking services subscription data.

In a more general example of application of the present invention, said at least part of first subscription data comprise subscription data. The at least part of the first subscription data comprising subscription data makes it unnecessary to re populate in each IMS Application data set a repository in the HSS when the Application need the data.

Examples of said at least part of first subscription data, comprising subscription data interesting to not re populate in said second subscription data, include:
- global configuration information such as roaming agreements (allowed PLMNs) or per subscriber permanent or temporary stored data such as Barring information, Closed user Group information, . . . etc.,
- QoS data stored in a subset of a HLR functionality of a HSS, required by a PS domain, and enabling to know if a subscriber has subscribed to the QoS necessary for providing a given service,
- . . . etc.

In another aspect of the present invention, said second database entity communicates with said first database entity to ensure that said at least part of first subscription data are stored in said second database entity, that are coherent with said at least a part of first subscription data stored in said first database entity.

Advantageously, said at least part of first subscription data correspond to data transparent to said second database entity.

Advantageously, said Application Server uses said second database entity as a repository for said at least a part of said subscription data.

Advantageously, said method comprises a step of mapping said at least part of said first subscription data to said second subscription data.

In particular, by this mapping, the legacy services Application Server can read/modify HLR call and/or session control data through the 3GPP standardized Sh interface using non transparent data as described in TS 29.328 and 29.329.

In particular:
said step of communication between said second database entity and said Application Server may comprise a step of using data handling procedures on the interface between said second database entity and said Application Server.

In particular:
said data handling procedures may include a Data Read procedure enabling said Application Server to download data from said second database entity.

In particular:
said data handling procedures may include a Data Update procedure enabling said Application Server to update data in said second database entity.

In particular, said updating of data may comprise at least one operation in a group comprising: adding data, modifying data, removing data.

In particular:
said step of communication between said second database entity and said Application Server may comprises using subscription/notification procedures on the interface between said second database entity and said Application Server.

In the examples illustrated in FIGS. 3 and 4:
said first database entity (noted HLR) corresponds to a HLR functionality of a HSS,
said second database entity (noted HSS) corresponds to a IMS functionality of a Home Subscriber Server,
said Application Server (noted AS) corresponds to an IMS Application Server.

In the examples illustrated in FIGS. 3 and 4, said communication between AS and HSS uses data handling procedures on the Sh interface between AS and HSS.

In the example illustrated in FIG. 3:
at step 10, the AS sends a data read command (message "Sh-pull") to the HSS,
at step 11, upon the reception of said data read command from the AS, the HSS sends a data read command to the HLR,
at step 12, upon the reception of said data read command from the HSS, the HLR sends HLR data to the HSS,
at step 13, the HSS maps said HLR data to IMS data,
at step 14, the HSS sends HLR data mapped to IMS data, to the AS ("message Sh-pull Resp").

In the example illustrated in FIG. 4:
at step 20, the AS sends a data update command (message "Sh-Update") to the HSS,
at step 21, upon the reception of said data update command from the AS, the HSS maps IMS data to HLR data,
at step 22, the HSS sends IMS data mapped to HLR data, to the HLR,
at step 23, the HLR sends a data update response to the HSS,
at step 24, the HSS sends a data update response (message "Sh-Update Resp") to the AS.

In the example illustrated in FIG. 3, steps 10 and 14 correspond to the steps of a Data Read procedure enabling the AS to download data from the HSS.

In the example illustrated in FIG. 4, steps 20 and 24 correspond to the steps of a Data Update procedure enabling the AS to update data in the HSS.

In the examples illustrated in FIGS. 3 and 4, said communication between AS and HSS uses subscription/notification procedures on the Sh interface between AS and HSS.

In the example illustrated in FIG. 5:
at step 30, the AS sends a notification subscription command (or message Sh-Subs_Notif) to the HSS,
at step 31, the HSS sends a corresponding command to the HLR,
at step 32, the HLR informs the HSS of a change to which the AS has subscribed,
at step 33, the HSS maps HLR data to IMS data,
at step 34, the HSS notifies the AS of the change to which the AS has subscribed (or message Sh-Notif).

In the example illustrated in FIG. 5, steps 30, 34 correspond to the steps of subscription/notification procedures on the Sh interface interface between the HSS and the AS.

If the HLR and the HSS are located in a same physical entity, the communication between the HLR and the HSS (such as illustrated for example by steps 11, 12 in FIG. 3, or steps 22, 23 in FIG. 4, or step 31, 32 in FIG. 5) can be internal to said physical entity. If the HLR and the HSS are not located in a same physical entity, some procedures can be defined for enabling said communication, according to usual principles enabling separate entities to communicate.

The present invention also has for its object an Application Server for a mobile communication network, said Application Server comprising:
means for communicating with a database entity referred to as a second database entity storing subscription data referred to as second subscription data for support to entities of said mobile communication network referred to as second entities, to have access, via said second database entity, to at least part of subscription data referred to as first subscription data stored in a database entity referred to as first database entity storing subscription data referred to as first subscription data for support to entities referred to as first entities of said mobile communication network.

The present invention also has for its object a database entity referred to as a second database entity, storing subscription data referred to as second subscription data for support to network entities referred to as second network entities of a mobile communication network, said second database entity comprising:

means for communicating with a database entity referred to as a first database entity, storing subscription data referred to as first subscription data for support to network entities of said mobile communication network referred to as first network entities, to have access to at least part of said first subscription data, means for communicating with an Application Server, to have access to said at least part of first subscription data via said second database entity.

The present invention also has for its object a database entity, referred to as a first database entity, storing subscription data referred to as first subscription data for support to network entities of a mobile communication network referred to as first network entities, said first database entity comprising:

means for communicating with a database entity referred to as a second database entity, storing subscription data referred to as second subscription data for support to network entities of said mobile communication network referred to as second network entities, to have access to at least part of said first subscription data.

The detailed implementation of the above-mentioned means does not raise any special problem for a person skilled in the art, and therefore such means do not need to be more fully disclosed than has been made above, by their function, for a person skilled in the art.

The invention claimed is:

1. A method to access subscription data stored in a first database entity of a mobile communication network, the first database entity including—first subscription data supporting first network entities of the mobile communication network, said method comprising:

communicating with a first database entity, by a second database entity, to have access to at least part of the first subscription data of the first database entity, the second database entity including second subscription data supporting second network entities of the mobile communication network, the at least part of first subscription data includes Call Control services subscription data; and communicating, by the second database entity, at least a portion of the part of the first subscription data of the first database entity to an Application Server such that the Application Server has access to the part of the first subscription data of the first database entity, wherein said second network entities correspond to internet protocol multimedia subsystem entities, said first database entity corresponds to a subset of home location registry functionality of a home subscriber server, said second database entity corresponds to an internet protocol (IP) multimedia subsystem functionality of the home subscriber server, and said Application Server corresponds to an internet protocol multimedia subsystem Application Server, the Application Server using the second database entity as a repository for the at least part of the first subscription data.

2. The method according to claim 1, wherein:
said first network entities correspond to circuit switched domain entities.

3. The method according to claim 2, wherein said Application Server communicates with said second database entity to support circuit switched services in said IP multimedia subsystem based on said Call Control services subscription data.

4. The method according to claim 1, wherein:
said first network entities correspond to packet switched domain entities.

5. The method according to claim 4, wherein said at least part of the first subscription data includes at least a part of Session Management services subscription data, and said Application Server communicates with said second database entity to support dedicated services in the IP multimedia subsystem based on said Session Management services subscription data.

6. The method according to claim 1, wherein:
said first network entities correspond to network entities required for interworking with wireless access technology.

7. The method according to claim 6, wherein said at least part of the first subscription data includes at least a part of interworking services subscription data, and said Application Server communicates with said second database entity to support dedicated services in the IP multimedia subsystem based on said interworking services subscription data.

8. The method according to claim 1, wherein said at least part of the first subscription data includes subscription data that is not re-populated independently in said second subscription data, and said Application Server communicates with said second database entity to support IP multimedia subsystem services based on subscription data including said at least part of the first subscription data so the subscription data including at least part of the first subscription data is not repopulated independently.

9. The method according to claim 1, wherein said second database entity communicates with said first database entity to ensure that said at least part of the first subscription data stored in said second database entity is coherent with said at least a part of the first subscription data stored in said first database entity.

10. The method according to claim 1, wherein said at least part of the first subscription data corresponds to data transparent to said second database entity.

11. The method according to claim 1, further comprising:
mapping said at least part of said the first subscription data to said second subscription data.

12. The method according to claim 1, wherein
the communicating, by the second database entity, at least the portion of the communicated first subscription data to said Application Server includes,
using data handling procedures on an interface between said second database entity and said Application Server.

13. The method according to claim 12, wherein said data handling procedures include a Data Read procedure enabling said Application Server to download data from said second database entity.

14. The method according to claim 12, wherein said data handling procedures include a Data Update procedure enabling said Application Server to update data in said second database entity.

15. The method according to claim 14, wherein said updating of data includes at least one operation in a group comprising adding data, modifying data, removing data.

16. A method according to claim 1, wherein
the communicating, by the second database entity, at least the portion of the communicated first subscription data to said Application Server includes,
using subscription/notification procedures on an interface between said second database entity and said Application Server.

17. An Application Server for a mobile communication network, said Application Server comprising:
a processor configured to communicate with a second database entity storing second subscription data to have access to at least part of first subscription data stored in a first database entity such that the Application Server has access to the part of the first subscription data of the first database entity, the second database entity stores the second subscription data to support second network entitles, and the first data base entity stores the first subscription data for support of first network entities of said mobile communication network, wherein said second network entities correspond to internet protocol multimedia subsystem entities, said first database entity corresponds to a subset of home location registry functionality of a home subscriber server, and said second database entity corresponds to an internet protocol (IP) multimedia subsystem functionality of the home subscriber server, the at least part of first subscription data includes Call Control services subscription data, the Application Server using the second database entity as a repository for the at least part of the first subscription data.

18. A second database entity storing second subscription data for support to second network entities of a mobile communication network, said second database entity comprising:
a first processor configured to communicate with a first database entity to access at least part of first subscription data, the first data base entity storing the first subscription data for support of first network entities to access at least part of said the first subscription data, the processor being further configured to communicate with an Application Server to access said at least part of the first subscription data via said second database entity such that the Application Server has access to the part of the first subscription data of the first database entity, wherein said first database entity corresponds to a subset of home location registry functionality of a home subscriber server, said second database entity corresponds to an internet protocol (IP) multimedia subsystem functionality of the home subscriber server, and said Application Server corresponds to an internet protocol multimedia subsystem Application Server, the at least part of first subscription data includes Call Control services subscription data, the Application Server using the second database entity as a repository for the at least part of the first subscription data.

19. A first database entity storing first subscription data for support of first network entities, said first database entity comprising:
a processor configured to communicate with a second database entity to have access to at least part of a first subscription data stored on the second database entity, said second database entity storing second subscription data to support second network entities, wherein said second network entities correspond to internet protocol multimedia subsystem entities, said first database entity corresponds to a subset of home location registry functionality of a home subscriber server, and said second database entity corresponds to an Internet protocol (IP) multimedia subsystem functionality of the home subscriber server, the at least part of first subscription data includes Call Control services subscription data, the second database entity being used as a repository for the at least part of the first subscription data by an Application Server, the second database entity communicating at least a portion of the first subscription data of the first database entity to the Application Server such that the Application Server has access to the portion of the first subscription data of the first database entity.

* * * * *